US008970707B2

(12) United States Patent
Marks et al.

(10) Patent No.: US 8,970,707 B2
(45) Date of Patent: Mar. 3, 2015

(54) COMPENSATING FOR BLOOMING OF A SHAPE IN AN IMAGE

(75) Inventors: Richard Lee Marks, Pleasanton, CA (US); Anton Mikhailov, Campbell, CA (US); Eric Larsen, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1110 days.

(21) Appl. No.: 12/435,226

(22) Filed: May 4, 2009

(65) Prior Publication Data

US 2010/0149340 A1 Jun. 17, 2010

Related U.S. Application Data

(60) Provisional application No. 61/138,515, filed on Dec. 17, 2008.

(51) Int. Cl.
| | |
|---|---|
| H04N 5/225 | (2006.01) |
| H04N 5/228 | (2006.01) |
| H04N 5/359 | (2011.01) |
| H04N 5/217 | (2011.01) |

(52) U.S. Cl.
CPC .............. *H04N 5/3591* (2013.01); *H04N 5/217* (2013.01)
USPC ................... 348/169; 348/222.1; 348/E5.024; 348/E5.031

(58) Field of Classification Search
USPC ............ 348/169, 221.1, 241, 222.1; 382/254, 382/263, 264, 272, 274, 275, 194, 221, 255, 382/295, 296, 298, 299, 254.255, 206
See application file for complete search history.

(56) References Cited

U.S. PATENT DOCUMENTS

| | | | |
|---|---|---|---|
| 5,047,847 A * | 9/1991 | Toda et al. ...................... 348/68 |
| 5,297,061 A | 3/1994 | Dementhon et al. |
| 5,454,043 A | 9/1995 | Freeman |
| 5,517,575 A * | 5/1996 | Ladewski ...................... 382/108 |
| 5,616,078 A | 4/1997 | Oh |
| 5,909,244 A * | 6/1999 | Waxman et al. ............ 348/222.1 |
| 6,088,479 A * | 7/2000 | Ikeshoji et al. ............... 382/170 |
| 6,373,918 B1 | 4/2002 | Wiemker et al. |
| 6,704,050 B1 * | 3/2004 | Washkurak et al. .......... 348/294 |
| 7,158,118 B2 | 1/2007 | Liberty |
| 7,239,301 B2 | 7/2007 | Liberty et al. |
| 7,262,760 B2 | 8/2007 | Liberty |
| 7,414,611 B2 | 8/2008 | Liberty |

(Continued)

FOREIGN PATENT DOCUMENTS

| | | |
|---|---|---|
| CN | 1627792 | 6/2005 |
| CN | 1867041 | 11/2006 |

(Continued)

OTHER PUBLICATIONS

Google Machine Translation of JP2005-136859.*

(Continued)

*Primary Examiner* — Kostas Katsikis
(74) *Attorney, Agent, or Firm* — Blakely Sokoloff Taylor & Zafman LLP

(57) ABSTRACT

A number of brightness samples are taken outside a shape to compensate for blooming of the shape in an image generated by a digital camera. The brightness of each of the samples is determined and averaged, and the size of the shape is adjusted based on the difference between the brightness of the shape and the average of the brightness samples.

25 Claims, 15 Drawing Sheets

(56) References Cited

U.S. PATENT DOCUMENTS

| | | | |
|---|---|---|---|
| 7,489,298 B2 | 2/2009 | Liberty et al. | |
| 7,489,299 B2 | 2/2009 | Liberty et al. | |
| 2001/0048753 A1* | 12/2001 | Lee et al. | 382/103 |
| 2002/0039441 A1* | 4/2002 | Klassen | 382/166 |
| 2002/0085097 A1 | 7/2002 | Colmenarez | |
| 2002/0097895 A1* | 7/2002 | Marshall et al. | 382/117 |
| 2002/0176605 A1* | 11/2002 | Stafsudd et al. | 382/106 |
| 2003/0086596 A1* | 5/2003 | Hipp et al. | 382/128 |
| 2003/0184827 A1* | 10/2003 | Fleury et al. | 358/520 |
| 2004/0032970 A1* | 2/2004 | Kiraly | 382/103 |
| 2004/0121268 A1* | 6/2004 | Conroy et al. | 430/321 |
| 2004/0257620 A1* | 12/2004 | Loce et al. | 358/2.1 |
| 2005/0030392 A1* | 2/2005 | Lee et al. | 348/241 |
| 2005/0117027 A1* | 6/2005 | Fukuhara et al. | 348/222.1 |
| 2005/0140829 A1 | 6/2005 | Uchida et al. | |
| 2005/0200837 A1* | 9/2005 | Mydlack et al. | 356/237.1 |
| 2005/0219363 A1* | 10/2005 | Kohler et al. | 348/187 |
| 2005/0276475 A1* | 12/2005 | Sawada | 382/167 |
| 2006/0013502 A1* | 1/2006 | Weigand | 382/275 |
| 2006/0114342 A1* | 6/2006 | Egawa | 348/241 |
| 2006/0139635 A1* | 6/2006 | Kersey et al. | 356/318 |
| 2006/0140445 A1 | 6/2006 | Cusack | |
| 2006/0262991 A1 | 11/2006 | Lee et al. | |
| 2007/0046786 A1* | 3/2007 | Tokuyama | 348/222.1 |
| 2007/0131846 A1* | 6/2007 | Eskerud | 250/208.1 |
| 2007/0147696 A1* | 6/2007 | Karl et al. | 382/254 |
| 2007/0188623 A1* | 8/2007 | Yamashita et al. | 348/222.1 |
| 2008/0024805 A1* | 1/2008 | Andresen et al. | 358/1.9 |
| 2008/0080789 A1 | 4/2008 | Marks et al. | |
| 2008/0088719 A1* | 4/2008 | Jacob et al. | 348/241 |
| 2008/0107360 A1* | 5/2008 | Yamashita et al. | 382/313 |
| 2008/0174685 A1 | 7/2008 | Shan et al. | |
| 2008/0274804 A1 | 11/2008 | Harrison et al. | |
| 2008/0279458 A1* | 11/2008 | Hong et al. | 382/211 |
| 2008/0284884 A1* | 11/2008 | Makino et al. | 348/296 |
| 2008/0291296 A1 | 11/2008 | Oike | |
| 2009/0021621 A1* | 1/2009 | Hashimoto et al. | 348/300 |
| 2009/0244482 A1* | 10/2009 | Elsner et al. | 351/206 |
| 2009/0303356 A1* | 12/2009 | Min et al. | 348/241 |

FOREIGN PATENT DOCUMENTS

| | | | |
|---|---|---|---|
| CN | 1992782 | 7/2007 | |
| EP | 0 587 138 A2 | 3/1994 | |
| EP | 1037166 | 9/2000 | |
| EP | 1096789 | 5/2001 | |
| GB | 2 345 538 A | 7/2000 | |
| GB | 2 388 418 A | 11/2003 | |
| JP | 60076716 A * | 5/1985 | G02B 23/26 |
| JP | 2005136859 | 5/2005 | |
| KR | 100156163 | 11/1998 | |
| KR | 20030076654 A * | 9/2003 | H04N 1/58 |
| KR | 20080103454 | 4/2010 | |
| WO | WO 02/27453 A2 | 4/2002 | |

OTHER PUBLICATIONS

PCT International Search Report and Written Opinion for PCT/US09/50314, mailed Sep. 8, 2009, 11 pages.

International Preliminary Report on Patentability and Written Opinion for International Patent Application No. PCT/US2009/050314, Mailed Jun. 30, 2011, 9 pages.

Non-Final Office Action for Korean Patent Application No. 2011-7016666, Mailed Aug. 22, 2012.

Non-Final Office Action for Japanese Patent Application No. 2011-542149, Mailed Mar. 4, 2013.

Canny, John, "A Computational Approach to Edge Detection", IEEE Trans. PAMI 8(6), 1986, 20 Pages.

Dureucu, Anne, et al., "Assessment of Laser-Dazzling Effects on TV-Cameras by means of Pattern Recognition Algorithms", The International Society for Optical Engineering, roc. SPIE 6738, Technologies for Optical Countermeasures IV, Oct. 10, 2007, XP002688642, http://proceedings.spiedigitallibrary.org/proceeding.aspx?articleid=823344.

Non-Final Office Action for Chinese Patent Application No. 200980150533.5, Mailed Nov. 18, 2013, 13 pages.

Extended European Search Report for European Patent Application No. 09833781.9, mailed Dec. 19, 2012.

First Office Action for Chinese Patent Application No. 200980150533.5, mailed Dec. 27, 2012.

Non-Final Office Action for Korean Patent Application No. 2011-7016666, mailed Jun. 25, 2013.

Third Office Action and Search Report for Chinese Patent Application No. 200980150533.5, mailed Jul. 21, 2014, 13 pages.

\* cited by examiner

| BLOOMING COMPENSATION TABLE 610 | |
|---|---|
| BRIGHTNESS DIFFERENTIAL 620 | ADJUSTMENT 630 |

FIG. 6

COMPENSATING FOR BLOOMING OF A SHAPE IN AN IMAGE

CROSS-REFERENCE TO RELATED APPLICATIONS

This application claims the benefit of U.S. Provisional Application No. 61/138,515, filed Dec. 17, 2008, which is hereby incorporated by reference.

BACKGROUND

1. Field

Embodiments of the invention relate to the field of image processing; and more specifically to compensating for blooming of a shape in an image.

2. Background

A pixel on a sensor in a digital camera receives light that is converted into an electrical charge. Each pixel has a limit to the amount of electrical charge it can store. When that limit has been exceeded, the charge may overflow from one pixel to another causing an effect called blooming. Blooming typically occurs when a bright object is near a darker object in the image plane (e.g., an object is placed in front of a window on a sunny day). The amount of bloom depends on the exposure and the brightness differential of the objects.

Blooming affects how an object appears as a shape in an image. For example, when a dark object is in front of a bright background, the dark object will appear smaller in the image than it actually is. Conversely, when a lighter object is in front of a darker background, the lighter object will appear larger in the image than it actually is.

BRIEF DESCRIPTION OF THE DRAWINGS

The invention may best be understood by referring to the following description and accompanying drawings that are used to illustrate embodiments of the invention. In the drawings:

FIG. 6 illustrates an exemplary blooming compensation table according to one embodiment of the invention;

DETAILED DESCRIPTION

Figure 1B:
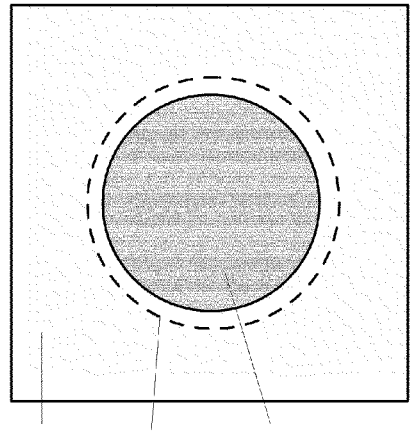
FIGS. 1B-1D illustrate an exemplary shape in an image distorted by blooming according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more computing devices (e.g., general purpose computer, gaming system such as a Sony® PlayStation 3® entertainment system, motion capture computing devices, etc.). Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine readable storage media and machine readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

A method and apparatus for compensating for blooming is described. In one embodiment of the invention, a number of brightness samples are taken outside a shape of interest in an image, the brightness of those samples are averaged, and the size of the shape is adjusted based on the difference between the brightness of the shape and the average of the brightness samples.

In another embodiment of the invention, a tracked object, such as a tracking sphere, is covered in a material that limits the angle of view of the tracked object such that images of the tracked object will include a halo surrounding the shape corresponding to the tracked object. The width of the halo is calculated and the size of the shape is adjusted based on that width.

Figure 1D:
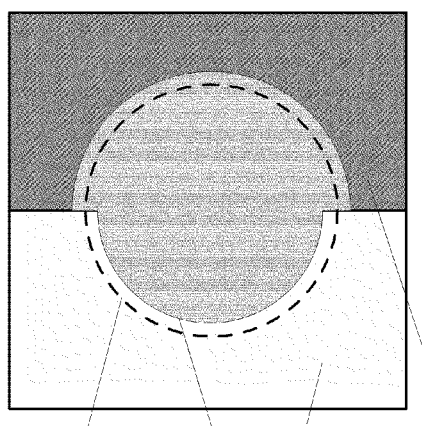
Figure 1A:
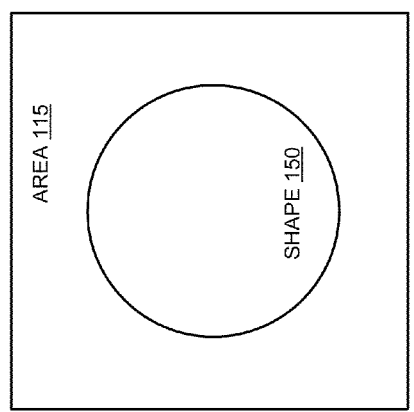
FIG. 1A illustrates an exemplary shape in an image that is not distorted by blooming according to one embodiment of the invention.

FIG. 1A illustrates an image including an exemplary shape that is not distorted by blooming according to one embodiment of the invention. According to one embodiment of the invention, the image 110 is generated by a digital camera (e.g., Sony PlayStation Eye camera, web camera, motion capture camera, etc.) The image 110 includes the shape 150 which is surrounded by the area 115. The shape 150 is an ellipse (as illustrated in FIG. 1A, the shape 150 is a circle). Although the shape 150 is illustrated as an ellipse, it should be understood that other shapes may be used in embodiments of the invention. In one embodiment of the invention, the shape 150 corresponds to a three-dimensional object such as a sphere and the area 125 corresponds to what is behind that three-dimensional object (the background).

The image 110 is composed of a number of pixels each having a brightness value and one or more color values. Thus, the shape 150 and the area 115 are each composed with a number of pixels each having a brightness value and one or more color values. The number of pixels in the image 110 typically depends on the type and/or setting of digital camera taking the image. Typically the brightness values of a pixel range from 0 (no brightness) to 255 (full brightness). For example, if the background is relatively bright (e.g., an open window on a sunny day), the brightness values of the pixels of the area 115 may be high (e.g., 255). As another example, if the background is relatively dark (e.g., a room with no windows and no lights), the brightness values of the pixels of the area 115 may be low. In FIG. 1A, the shape 150 is not affected by blooming. In other words, the brightness of the background does not distort the size or the shape of the shape 150.

FIG. 1B illustrates an example of the shape 150 distorted by blooming according to one embodiment of the invention. The image 120 includes the shape 150 which is surrounded by the area 125. Similarly as described with reference to FIG. 1A, the shape 150 corresponds to a three-dimensional object (e.g., a sphere), and the area 125 corresponds to what is behind the object (the background). The background is relatively brighter than the object corresponding to the shape 150. Thus, because of the brightness differential, blooming affects the size of the shape 150. Specifically, blooming has caused the true size of the object to appear in the image 120 as a shape smaller than it actually is. Thus, the brightness of the background relative to the brightness of the object has caused the shape 150 to appear smaller than it should be. The size of the shape that should appear in the image 120 (i.e., if there is no blooming) is represented by the dashed line 128 surrounding the shape 150. It should be understood that a small differential in brightness values of the background and the object will have no to little blooming affect on the shape 150.

Figure 1C:
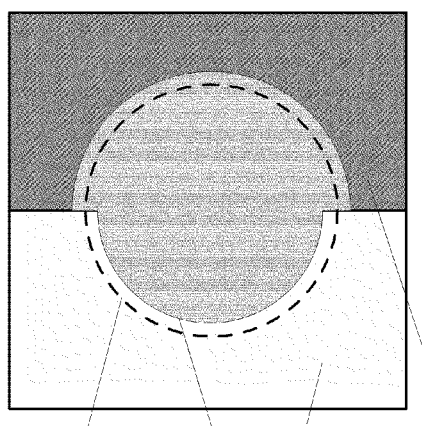

FIG. 1C illustrates another example of the shape 150 distorted by blooming according to one embodiment of the invention. The image 130 includes the shape 150 which is surrounded by the area 135. Similarly as described with reference to FIGS. 1A and 1B, the shape 150 corresponds to a three-dimensional object (e.g., a sphere) and the area 135 corresponds to what is behind the object (the background). In FIG. 1C, the background is relatively darker than the object corresponding to the shape 150. In other words, the object corresponding to the shape 150 is brighter than the surrounding background. Because of this brightness differential, blooming affects the size of the shape 150 in the image 130. Specifically, blooming causes the true size of the object to appear in the image 130 as a shape larger than it actually is. Thus, the brightness of the background relative to the brightness of the object has caused the shape 150 to appear larger than it should be. The size of the shape that should appear in the image 130 (i.e., if there is no blooming) is represented by the dashed line 128 within the shape 150.

FIG. 1D illustrates another example of the shape 150 distorted by blooming according to one embodiment of the invention. The image 140 includes the shape 150. Half of the shape 140 is surrounded by the area 145 and the other half of the shape 140 is surrounded by the area 148. The shape 150 corresponds to a three-dimensional object (e.g., a sphere) and the area 145 and the area 148 collectively correspond to the background of the object. The background corresponding to the area 145 is brighter than the object and the background corresponding to the area 148. The object corresponding to the shape 150 is brighter than the background corresponding to the area 148. Thus, a portion of the background is brighter than the object, and another portion of the background is darker than the object. The brightness differential between each portion of the background causes blooming which affects the size of the shape 150 in the image 140.

The size of the shape that should appear in the image 140 (i.e., if there is no blooming) is represented by the dashed line 128. Since the background corresponding to the area 145 is brighter than a portion of the object, the size of the corresponding portion of the shape 150 appears smaller than it should be. Similarly, since the background corresponding to the area 148 is darker than a portion of the object, the size of the corresponding portion of the shape 150 appears larger than it should be. Thus, the size of the shape 150 has decreased in one portion and increased in another portion because of blooming.

Figure 2:
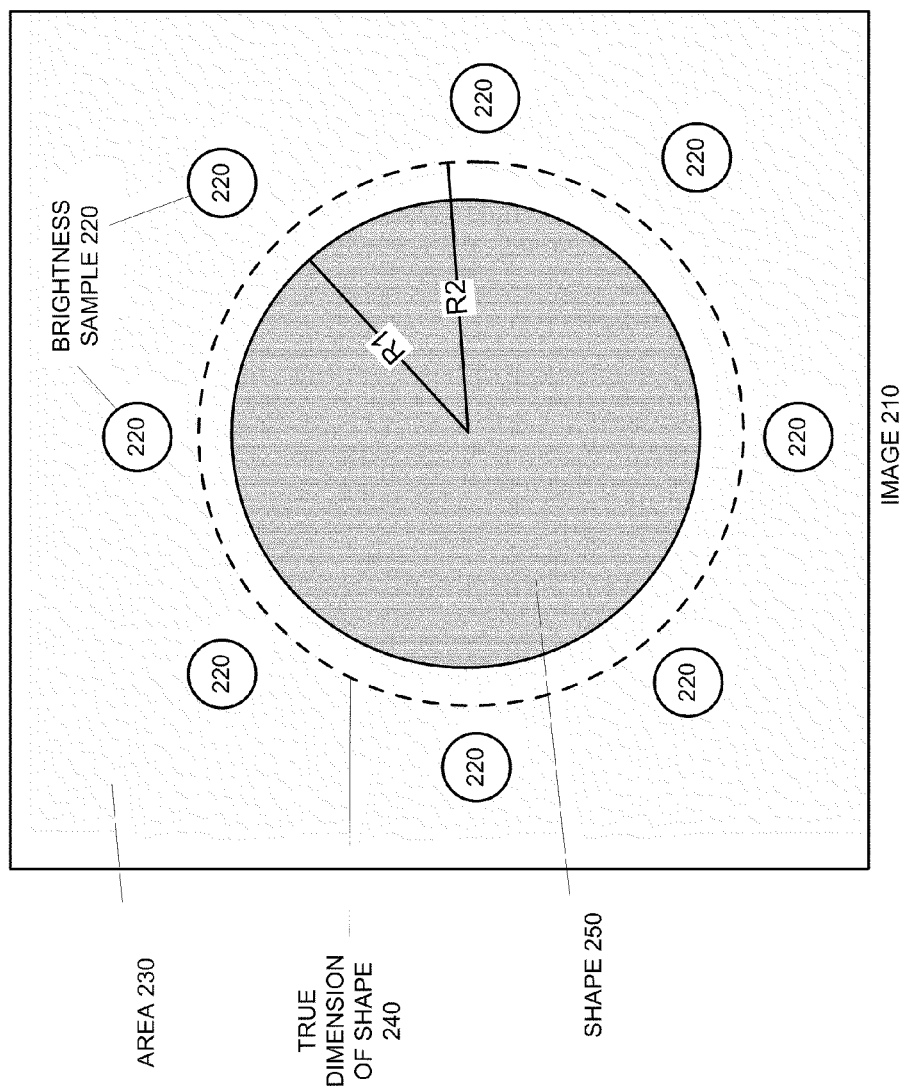
FIG. 2 illustrates a shape in an image distorted by blooming and an exemplary blooming compensation according to one embodiment of the invention.
Figure 3:
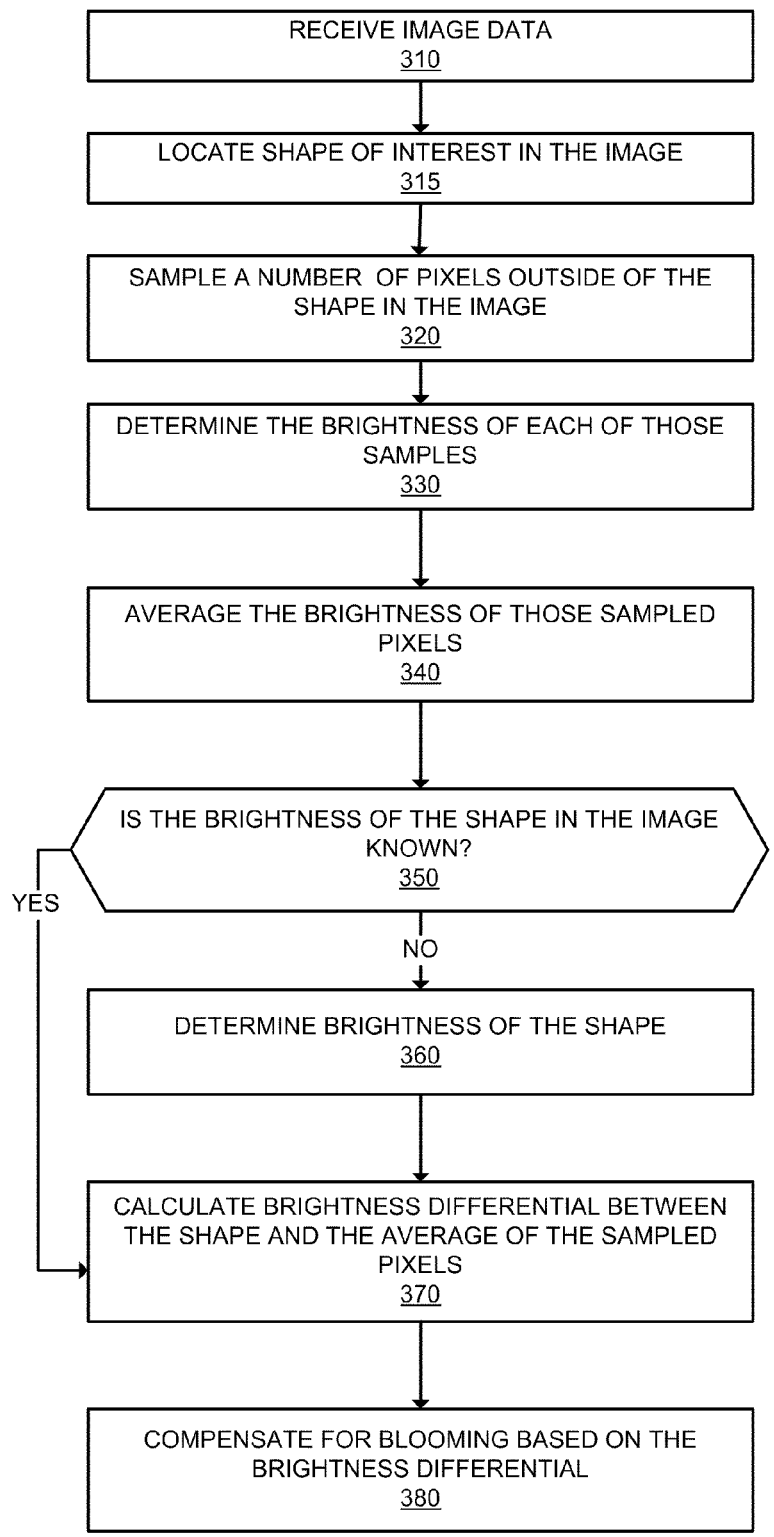
FIG. 3 is a flow diagram illustrating an exemplary blooming compensation mechanism according to one embodiment of the invention.

FIG. 2 illustrates a shape in an image distorted by blooming and an exemplary blooming compensation mechanism according to one embodiment of the invention. FIG. 2 will be described with reference to the exemplary operations of FIG. 3. FIG. 3 is a flow diagram illustrating an exemplary blooming compensation mechanism according to one embodiment of the invention. It should be understood that the embodiments of the invention discussed with reference to FIG. 2 can perform operations different than those discussed with reference to FIG. 3, and FIG. 3 can be performed by embodiments of the invention other than those discussed with reference to FIG. 2.

Figure 11:
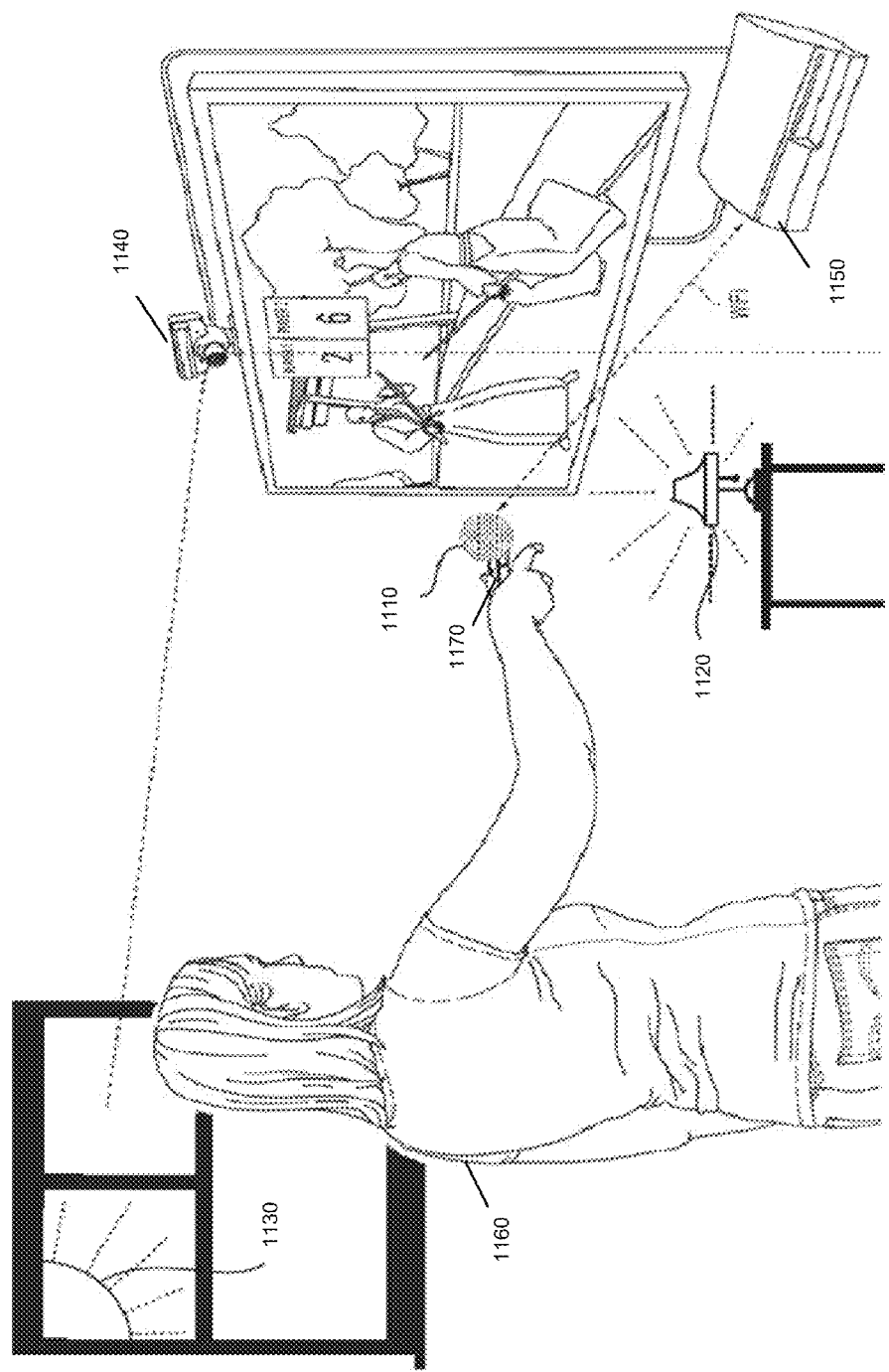
FIG. 11 illustrates an exemplary environment when generating images according to one embodiment of the invention.
Figure 12:
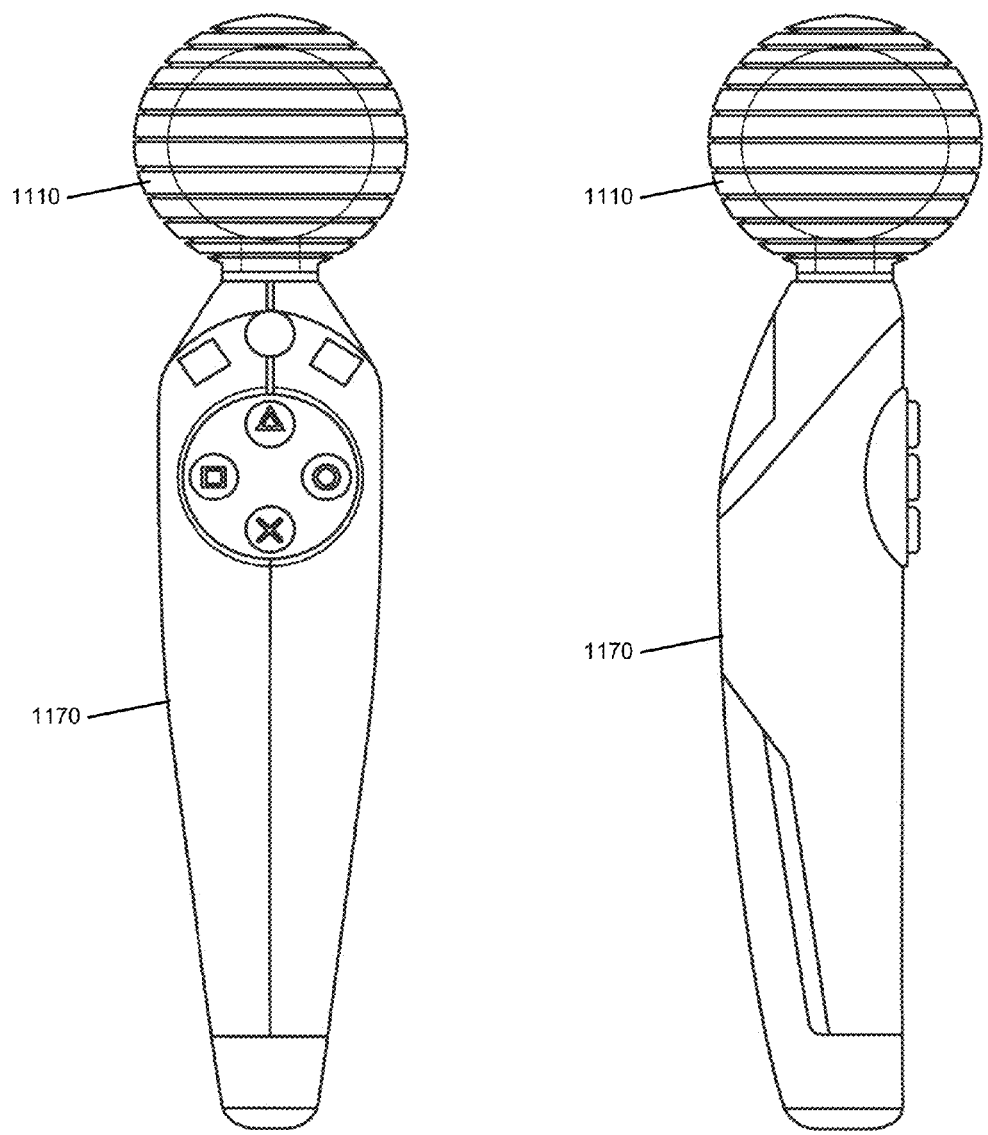
FIG. 12 illustrates an exemplary game controller with a tracked sphere according to one embodiment of the invention.

FIG. 2 includes the image 210. According to one embodiment of the invention, the image 210 is generated by a digital camera. For example, in one embodiment of the invention, an environment such as illustrated in FIG. 11 is used when generating the image 210. FIG. 11 illustrates a user 1160 playing a video game on a computing device 1150 such as a Sony® PlayStation 3® entertainment system. Of course, it should be understood that the computing device 1150 is not limited to a PlayStation, as other computing devices may be used in embodiments of the invention (e.g., general purpose computer, other types of gaming systems, motion capture systems, etc.). According to one embodiment of the invention, the user controls movement of characters and/or cursor on the screen via the game controller 1170. The game controller 1170 is coupled with a tracking sphere 1110. FIG. 12 illustrates the game controller 1170 with the tracking sphere 1110 according to one embodiment of the invention. Tracking of the sphere 1110 allows the computing system 1150 to track movement of the game controller 1170 and correlate that movement with the actions corresponding to the computing device 1150 (e.g., to control a cursor, to control characters in a video game, etc.). For example, the camera 1140 (e.g., a Sony PlayStation Eye camera, web camera, other digital cameras, etc.) takes images that include the tracked sphere 1110 and communicates the image data to the computing device 1150 for processing.

Figure 13:
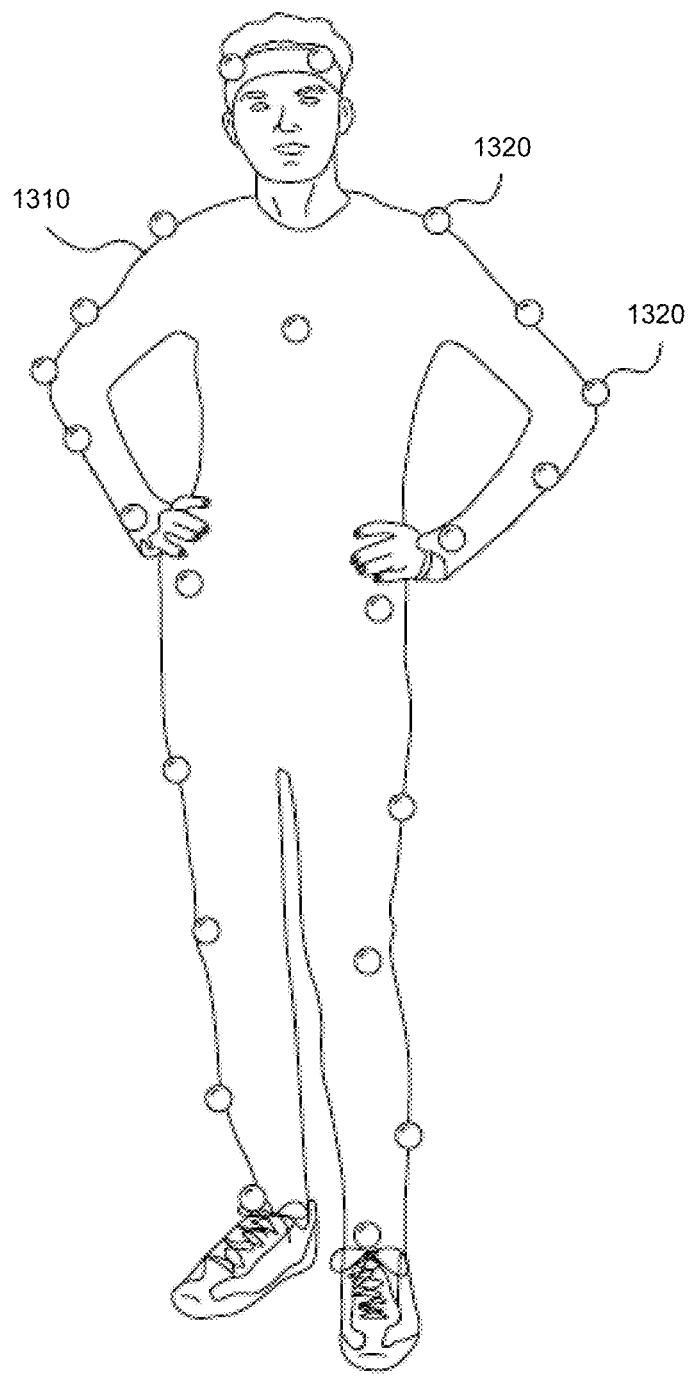
FIG. 13 illustrates multiple motion capture balls disposed on a user according to one embodiment of the invention.

According to another embodiment of the invention, the tracked object may be part of a motion capture system. For example, FIG. 13 illustrates multiple motion capture balls 1320 disposed on a user 1310. Motion capture balls 1320 are markers worn by the user 1310 to enable an imaging device to capture and identify the user's motion based on the positions or angles between the motion capture balls 1320. In one embodiment of the invention, the motion capture balls 1320 are attached to a motion capture suit. A digital camera generates images of the motion capture balls and transmits that information to a computing device.

The image 210 is taken by the camera 1140 and communicated to the computing device 1150 for processing. The image 210 includes the shape 250 which is surrounded by the area 230. According to one embodiment of the invention, a three-dimensional object (e.g., the sphere 1110) corresponds with the shape 250. Although the shape 250 is illustrated as an ellipse, it should be understood that the shape 250 may take the form of other geometric shapes. In addition, while the shape 250 has taken the form of a circle (a circle is a special case of an ellipse), it should be understood that the shape of 250 may be an ellipse which is not a circle.

The object corresponding to the shape 250 (e.g., the sphere 1110) is darker than the background corresponding to the area 230. As illustrated in FIG. 11, lighting conditions (both natural and artificial) in the camera's field of view affect the brightness of the background. For example, the natural light 1130 and the artificial light 1120 both affect the brightness of the background (and subsequently the amount of blooming). Thus, the amount of brightness differential between the background and the object may cause blooming causing the shape 250 to appear smaller than what it would appear if blooming did not occur. It should be understood that the incorrect size of the shape 250 may adversely effect the calculations of determining location of the object corresponding to the shape 250 (e.g., the sphere 1110) in relation to the camera (e.g., the camera 1140). For example, if the shape 250 is smaller in the image than it should be, the object corresponding to the shape 250 may be calculated to be at a farther distance away from the camera than it actually is. Conversely, if the shape 250 is larger in the image than it should be, the object corresponding to the shape 250 may be calculated to be at a closer distance to the camera than it actually is. According to one embodiment of the invention, to compensate for this blooming, the exemplary operations of FIG. 3 are performed. In FIG. 2, the background corresponding to the area 230 is brighter than the shape 250 and blooming causes the shape 250 to appear smaller than it should appear (the size of the shape that should appear in the image 210 is represented by the dashed line 240).

With reference to FIG. 3, at block 310, image data is received. For example, a computing system receives image data corresponding to an image taken by a digital camera. The image data includes the brightness value and the one or more color values of each pixel in the image. With reference to FIG. 11, the camera 1140 generates images (e.g., of the user using the controller 1170) and communicates this information to the computing device 1150. According to one embodiment of the invention, the computing device 1150 stores the received image data in an internal memory. As mentioned above, an image of the sphere 1110 (particularly the size of the sphere 1110 when projected onto the image) may be distorted due to the lighting conditions when the image was generated (e.g., the natural light 1130 and the artificial light 1120 may cause the image to be distorted). With reference to FIG. 2, the image 210 is received. Flow moves from block 310 to block 315.

At block 315, the shape of interest in the image is located. For example, with reference to FIG. 2, the shape 250 in the image 210 is located. The pixels of the image 210 are analyzed to determine the location (x, y coordinates) of the shape 250 within the image 210. While in one embodiment of the invention the location of the shape of interest is determined by analyzing the image data to locate a predetermined shape, in alternative embodiments of the invention the shape of interest is located differently (e.g., based on the color of light emitted by the object corresponding to the shape of interest, based on the brightness of the object corresponding to the shape of interest, a combination of the color of light, brightness, and/or shape of the object, etc.). If the shape of interest is predetermined to be an ellipse, after the image 210 has been analyzed and the pixels corresponding to the shape 250 have been determined, the centroid of the shape 250 is determined (e.g., by the weighted averages of the pixels, etc.). As part of locating the shape of interest in the image, the centroid of the shape of interest is determined. Flow moves from block 315 to block 320.

At block 320, a number of pixels outside of the shape of interest (e.g., the shape 250) are sampled (e.g., accessed). According to one embodiment of the invention, the sampled pixels are accessed to determine their respective brightness levels. For example, the image data is accessed to determine the brightness values of those sampled pixels. According to one embodiment of the invention, the brightness samples are distributed around each edge of the shape of interest. Of course, it should be understood that the brightness samples may be distributed in other ways (e.g., a random distribution, a function of the brightness of previous samples, etc.).

While in one embodiment of the invention the number of brightness samples is a function of the size of the shape of interest in the image, in alternative embodiments of the invention the number of brightness samples are determined differently (e.g., predetermined, function of the type of the shape of interest, function of the brightness of the shape of interest, or any combination of the size, shape, and brightness of the shape of interest).

Flow moves from block 320 to block 330. At block 330, the brightness of each of the samples is determined (e.g., by accessing the brightness value of those pixels). It should be understood that the brightness samples around the shape of interest in the image may each have different brightness values (that is, the brightness values of each sample is independent). Flow moves from block 330 to block 340, where the brightness average of those brightness samples is calculated. Flow moves from block 340 to block 350.

At block 350, a determination is made whether the brightness of the shape of interest is known. If the brightness of the shape of interest is not known, then flow moves to block 360 where the brightness is determined. However, if the brightness of the shape of interest is known, then flow moves to block 370. According to one embodiment, the brightness of the shape of interest is known and expected to be substantially uniform throughout the image (reflections, poor image quality, etc, may affect the uniformity). For example, with reference to FIG. 11 the sphere 1110 emits a light at a certain brightness that is known to the computing device 1150. However, in other embodiments of the invention, the brightness of the object (and hence the brightness of the shape corresponding to the object) is unknown and must be determined. According to one embodiment of the invention, the brightness of the shape may be determined by sampling a number of pixels of the shape on the image and averaging the brightness values from those pixels.

At block 370, the difference between the brightness of the shape and the brightness average of the sampled pixels is calculated. According to one embodiment of the invention, a negative brightness differential indicates that the shape of interest is brighter than the average brightness of the background, a positive brightness differential indicates that the shape of interest is darker than the average brightness of the background, and no brightness differential indicates that the shape of interest and the average brightness of the background are the same. Of course it should be understood that a positive brightness differential may indicate that the shape of interest is brighter than the average brightness of the background, etc. Flow moves from block 370 to block 380.

At block 380, a compensation for blooming based on the brightness differential is performed. For example, the size of the shape may be expanded if the shape is darker than the background, while the size of the shape may be contracted if the shape is brighter than the background. According to one embodiment of the invention, the amount of compensation is based on analyzing empirical data. For example, FIG. 6 illustrates an exemplary blooming compensation table 610 that includes a column 620 for brightness differential, and a column 630 for an amount of adjustment. According to one embodiment of the invention, the values in the blooming compensation table 610 are determined through an empirical analysis. For example, using different brightness values of the object producing the shape of interest (e.g., the sphere 1110), and different brightness backgrounds, with the distance between the camera and the object being known, a measurement may be taken to determine the amount of bloom, if any, has occurred for each scenario. With this process, the values in the blooming compensation table 610 may be entered.

Of course, it should be understood that instead of a blooming compensation table, other methods may be used to compensate for blooming. For example, instead of a blooming compensation table, a blooming compensation function may be applied which generates an amount of compensation. Generally, the effect of blooming is different (non-linear) as the tracked object is moved closer to, and farther from, an object having a different brightness. Thus, according to one embodiment of the invention, the blooming compensation function is a non-linear function that may approximately map to a quadratic function.

According to one embodiment of the invention, if the shape of interest is an ellipse, the values in the adjustment column 630 indicate how much to adjust the semi-major access of the ellipse. For example, with reference to FIG. 2, the shape 250 is an ellipse (specifically, it is a circle) and includes the radius R1 (the radius of a circle is also its semi-major access). As described above, the background 230 is brighter than the shape 250 causing the shape 250 to appear smaller than it should be. The value in the adjustment column 630 corresponding to the brightness differential of the shape 250 and the average of the brightness samples 220 indicate that the radius of the shape 250 is to be increased to the radius R2.

Thus, even though the shape 250 is affected by blooming (i.e., the size and appearance of the shape 250 is distorted by blooming), the data corresponding to the shape 250 is adjusted to compensate for the blooming Applications which depend on a correct size of the object in an image (e.g., tracking systems such as a gaming motion control system exemplary illustrated in FIG. 11, motion capture systems, etc.) may compensate for blooming using the exemplary operations described above.

The exemplary operations to compensate for blooming described with reference to FIGS. 2 and 3 may be enhanced by separating the image into two or more areas each having their own brightness samples and brightness average. According to one embodiment of the invention, separating the image into a plurality of areas when compensating for blooming has the advantage where one region of the object corresponding to the shape is brighter than the other region(s).

Figure 4:
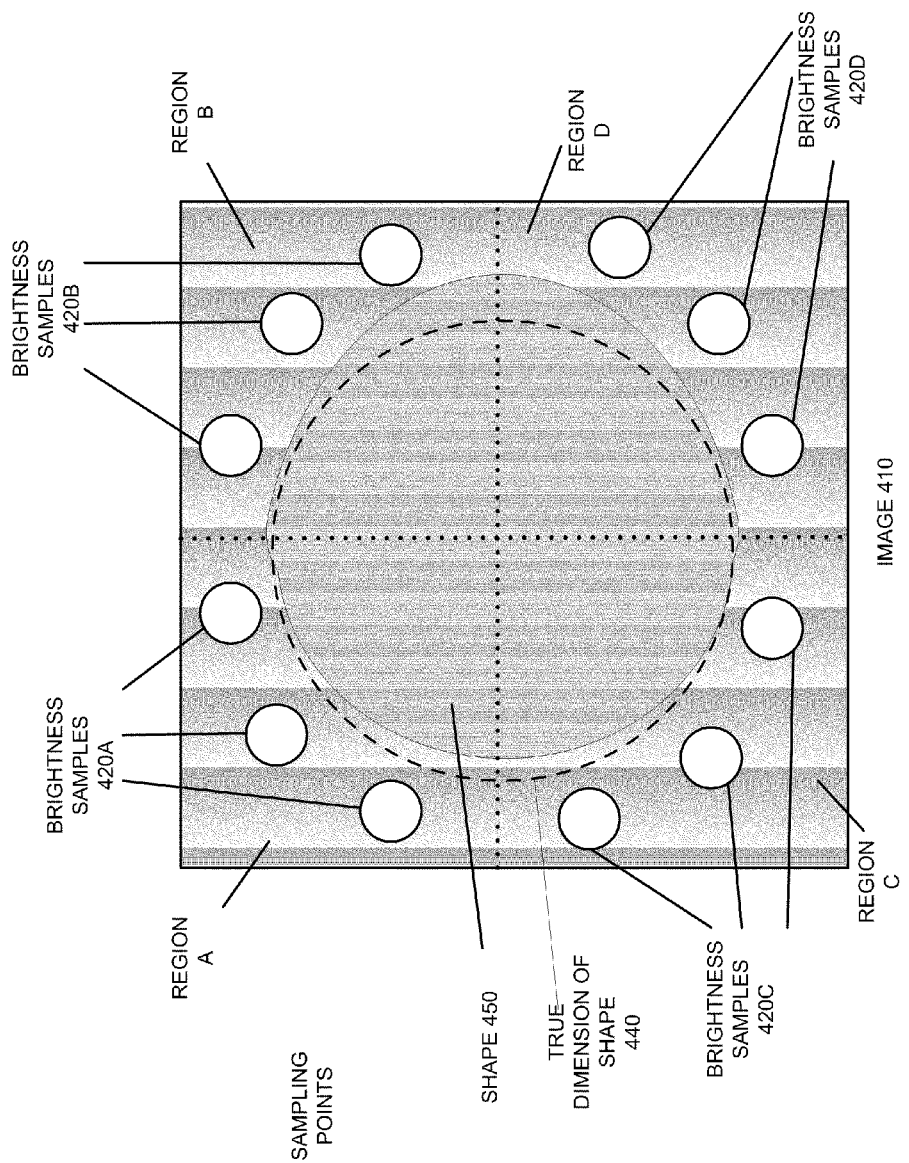
FIG. 4 illustrates a shape in an image distorted by blooming and an exemplary blooming compensation according to one embodiment of the invention.
Figure 5:
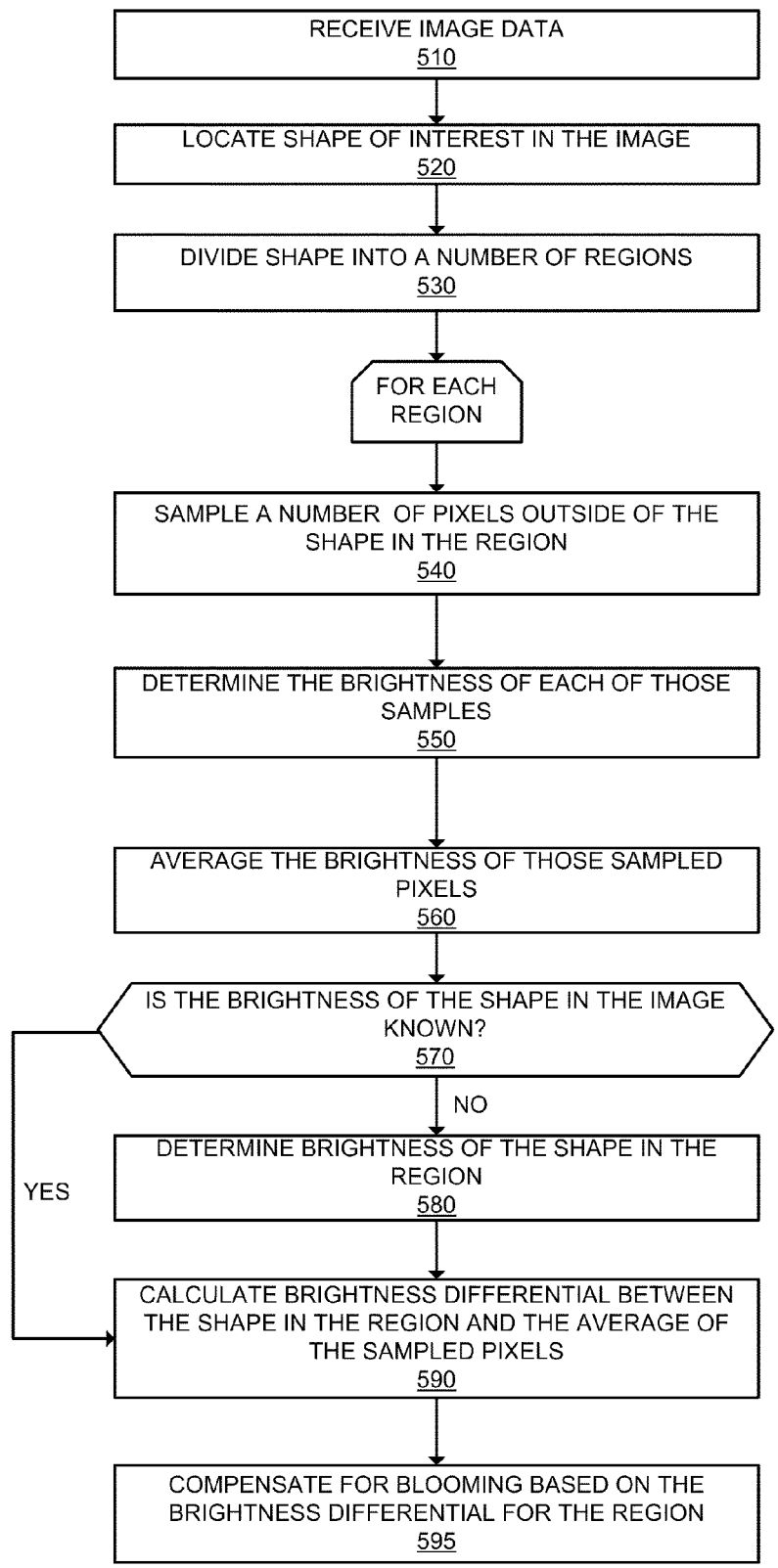
FIG. 5 is a flow diagram illustrating another exemplary blooming compensation mechanism according to one embodiment of the invention.

FIG. 4 illustrates a shape in an image distorted by blooming and an exemplary blooming compensation similar to that described with reference to FIGS. 2 and 3 with the addition that the shape is separated into multiple regions each having its own brightness samples and brightness average. FIG. 4 will be described with reference to the exemplary operations of FIG. 5. FIG. 5 is a flow diagram illustrating a blooming compensation mechanism according to one embodiment of the invention. It should be understood that the embodiments of the invention discussed with reference to FIG. 4 can perform operations different than those discussed with reference to FIG. 5, and FIG. 5 can be performed by embodiments of the invention other than those discussed with reference to FIG. 4.

FIG. 4 includes the image 410 generated by a digital camera in a similar way as image 210 is generated. The image 410 includes the shape 450. It should be understood that an object (e.g., the sphere 1110) corresponds with the shape 450. The shape 450 is divided into multiple regions (region A, region B, region C, and region D). Although the shape 450 is illustrated mostly in the center of the image 410, it should be understood that the shape 450 may not be in the center of the image 410.

With reference to FIG. 5, at block 510 image data is received. For example, in one embodiment of the invention, a computing system receives image data corresponding to an image taken by a digital camera. With reference to FIG. 11, the camera 1140 generates images (e.g., of the user using the controller 1170) and communicates this information to the computing device 1150. As mentioned above, the image of the controller 1170 and specifically the size of the sphere 1110, may be affected by the lighting conditions (e.g., the natural light 1130 and the artificial light 1120). With reference to FIG. 4, the image 410 is received. Flow moves from block 510 to block 520.

At block 520, the shape of interest in the image is located. For example, with reference to FIG. 4, the shape 450 in the image 410 is located. In one embodiment of the invention, the shape 450 is located using similar mechanisms as used to locate the shape 250 in block 315. Flow moves from block 520 to block 530.

At block 530, the shape of interest is divided into a number of regions. With reference to FIG. 4, the shape 450 is divided into four regions region A, region B, region C, and region D. Although the shape 450 is divided into four regions, it should be understood that in some embodiments of the invention the shape is be divided into N number of regions, where N is greater than 1. According to one embodiment of the invention, the centroid of the shape of interest is determined and the regions are divided from that centroid. In other words, the origin of each region is the centroid of the shape of interest. However, it should be understood that different, alternative ways of dividing the shape into a number of regions may be performed in embodiments of the invention described herein. Flow moves from block 530 to block 540.

The operations of the blocks 540-595 are performed for each region. At block 540, a number of pixels outside of the shape of interest in the region are sampled in a similar way as described with reference to block 320 in FIG. 3. Flow moves from block 540 to block 550. At block 550, the brightness of each of the samples are determined (e.g., by accessing the brightness value of those pixels). It should be understood that the brightness samples around the shape of interest in each region may each have different brightness values (that is, the brightness values of each sample is independent). Flow moves from block 550 to block 560 where the brightness average of those brightness samples is calculated. Flow moves from block 560 to block 570.

At block 570, a determination is made whether the brightness of the shape of interest is known. If the brightness of the shape of interest is not known, then flow moves to block 580 where the brightness is determined. However, if the brightness of the shape of interest is known, then flow moves to block 590. According to one embodiment, the brightness of the shape of interest is known and expected to be substantially uniform throughout the image. However, it should be understood that reflections, poor image quality, etc., may affect the uniformity of the brightness of the shape of interest. With reference to FIG. 11, the sphere 1110 typically emits a light at a certain brightness that is known to the computing device 1150. However, in other embodiments of the invention, the brightness of the object (and hence the brightness of the shape corresponding to the object) is unknown and must be determined. According to one embodiment of the invention, the brightness of the shape may be determined by sampling a number of pixels of the shape on the image and averaging the brightness values from those pixels.

At block 590, the difference between the brightness of the shape in the region and the brightness average of the sampled pixels is calculated. Flow moves from block 590 to 595, where a compensation for blooming based on the brightness differential for the region is performed. Similarly as described with reference to block 380, according to one embodiment of the invention the amount of compensation is based on analyzing empirical data (e.g., using the blooming compensation table 610).

Figure 7:
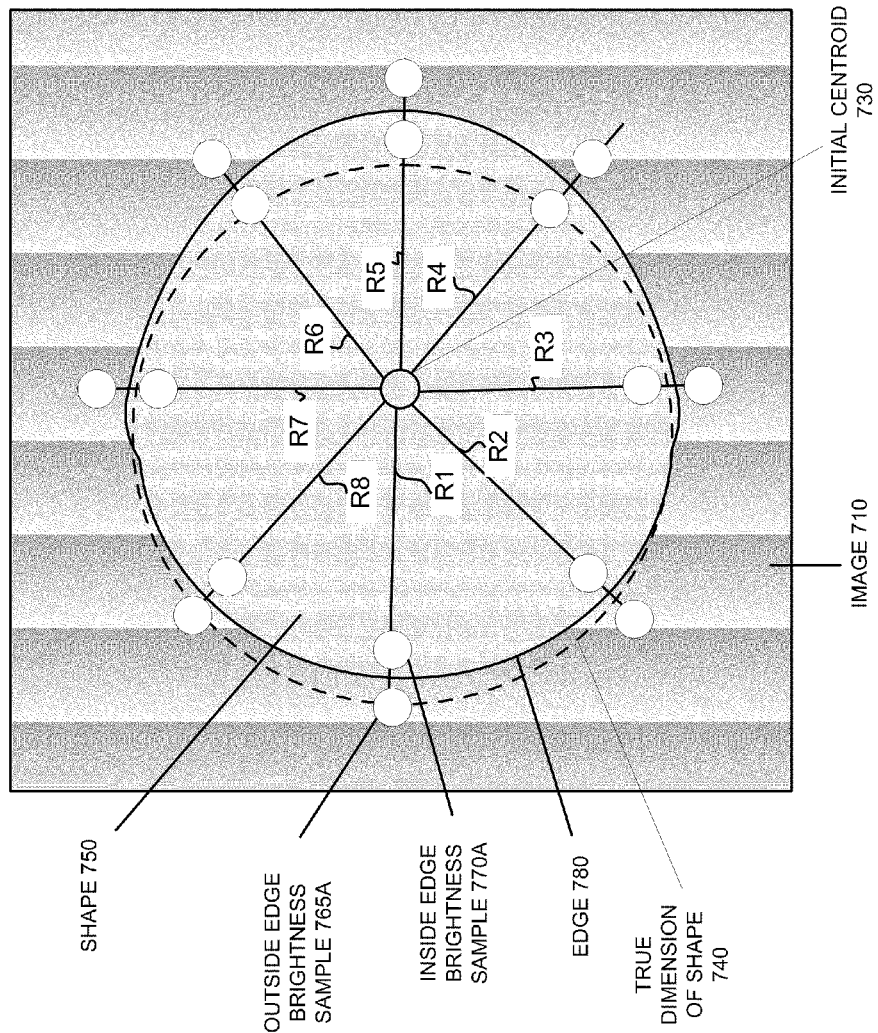
FIG. 7 illustrates a shape in an image distorted by blooming and an exemplary blooming compensation according to one embodiment of the invention.
Figure 8:
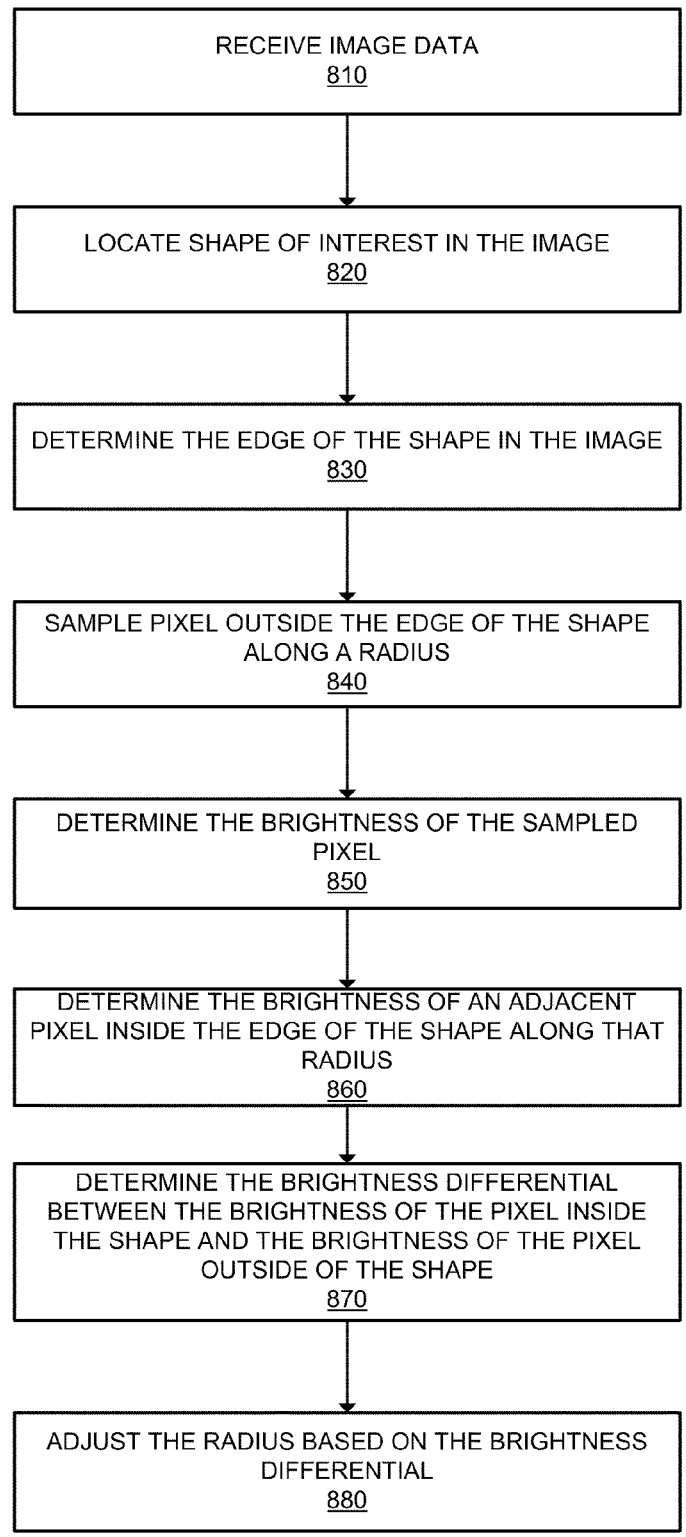
FIG. 8 is a flow diagram illustrating another exemplary blooming compensation mechanism according to one embodiment of the invention.

FIG. 7 illustrates an object in an image plane distorted by blooming and an exemplary blooming compensation according to one embodiment of the invention. FIG. 7 will be described with reference to the exemplary operations of FIG. 8. FIG. 8 is a flow diagram of a blooming compensation mechanism according to one embodiment of the invention. It should be understood that the embodiments of the invention discussed with reference to FIG. 7 can perform operations different than those discussed with reference to FIG. 8, and FIG. 8 can be performed by embodiments of the invention other than those discussed with reference to FIG. 7.

FIG. 7 includes the image 710 generated by a digital camera in a similar way as the image 210 is generated. The image 710 includes the shape 750. It should be understood that an object (e.g., the sphere 1110) corresponds with the shape 750. As illustrated in FIG. 7, lighting conditions during generation of the image 710 has caused blooming which affects the size and appearance of the shape 750. The dashed line 740 represents the size and appearance of the shape 750 if there is no blooming effect. As illustrated in FIG. 7, blooming causes a portion of the shape 750 to appear smaller that it should, and a portion of the shape 750 to appear larger than it should. According to one embodiment of the invention, a plurality of radii (e.g., R1 through R8) are adjusted based on brightness samples taken along the edge 780 of the shape 750.

With reference to FIGS. 7 and 8, at block 810 image data 710 is received (e.g., with reference to FIG. 11, the camera 1140 generates images and communicates the image data to the computing device 1150). Flow moves from block 810 to block 820 where the shape of interest 750 in the image 710 is located. In one embodiment of the invention, the shape 750 is located using similar mechanism as used to locate the shape 250 in block 315. Flow moves from block 820 to block 830.

At block 830, the edge of the shape (e.g., the edge of the shape 750 as denoted by solid line 780) in the image is determined. According to one embodiment of the invention, the edge of the shape is determined by analyzing the pixels in the image to determine those pixels which are at the edge of the shape. For example, beginning at the centroid of the shape 750 (e.g., the initial centroid 730), a plurality of pixels are analyzed for a plurality of radii (e.g., radii R1 to R8) of the shape 750. The pixels along each radius are analyzed until locating a non-shape pixel. For example, if the color of the shape is known, the pixels along each radius are analyzed until reaching a different color. It should be understood that any number of radii may be analyzed to determine the edge of the shape. For example, in FIG. 7, eight different radii have been calculated (e.g., every 45 degrees from the centroid). Flow moves from block 830 to block 840, where a brightness sample is taken outside the edge of the shape along one of the radii. For example, with reference to FIG. 7, an outside edge brightness sample 765A is taken outside the edge 780 along the radius R1. Flow moves from block 840 to block 850 where the brightness of that sample is determined. Flow moves from block 850 to block 860 where the brightness of an adjacent pixel along the same radii inside the edge of the shape is determined. According to one embodiment of the invention, the brightness values of the pixels of the shape 850 are substantially constant and known (e.g., the brightness value corresponding to the shape 850 is stored within the computing device 1150). However, if the brightness values of the shape 850 are not known, a pixel inside the edge of the shape adjacent to the sample outside the edge of the shape is sampled to determine its brightness value. For example, with reference to FIG. 7, an inside edge brightness sample 770A is taken inside the edge 780 along the radius R1. Flow moves from block 860 to block 870.

At block 870, the difference between the brightness of the shape along the radius (e.g., the pixel within the shape) and the brightness of the sampled pixel is determined. For example, with reference to FIG. 7, the difference between the brightness of the inside edge brightness sample 770A and the brightness of the outside edge brightness sample 765A is determined. Flow moves from block 870 to block 880. At block 880, the radius (e.g., radius R1) is adjusted based on the brightness differential of the outside edge sample and the inside edge sample. Similarly as described with reference to block 380, according to one embodiment of the invention, the amount of compensation (i.e., how much the radius is adjusted) is based on empirical data analysis (e.g., using the blooming compensation table 610, using a blooming compensation function, etc.). For example, with reference to FIG. 7, the radius R1 corresponding to the outside edge brightness sample 765A and the inside edge brightness sample 770A is adjusted to compensate for blooming.

According to one embodiment of the invention, the operations of the blocks 840-880 are repeated for each of the radii (e.g., radii R2 to R8). For example, up to N outside edge brightness samples and N inside edge brightness samples may be taken for N radii. For each pair of samples (inside and outside edge sample), the radius corresponding to those samples will be adjusted based on the samples brightness differential. Of course, it should be understood that if the brightness of the pair of samples is the same or very small, the radius may not be adjusted.

According to one embodiment of the invention, after all of the brightness corrections have been performed for each radius, the centroid of the shape is updated based on the updated radius values. With the updated centroid, the process described above in FIG. 8 (e.g., operations 830 through 840) are repeated. This may be repeated until a previously calculated centroid and the currently calculated centroid are close (e.g., within a pixel), and/or until a number of iterations have been performed (e.g., five iterations). Generally, repeating this process will improve the accuracy of the blooming error compensation.

Figure 9:
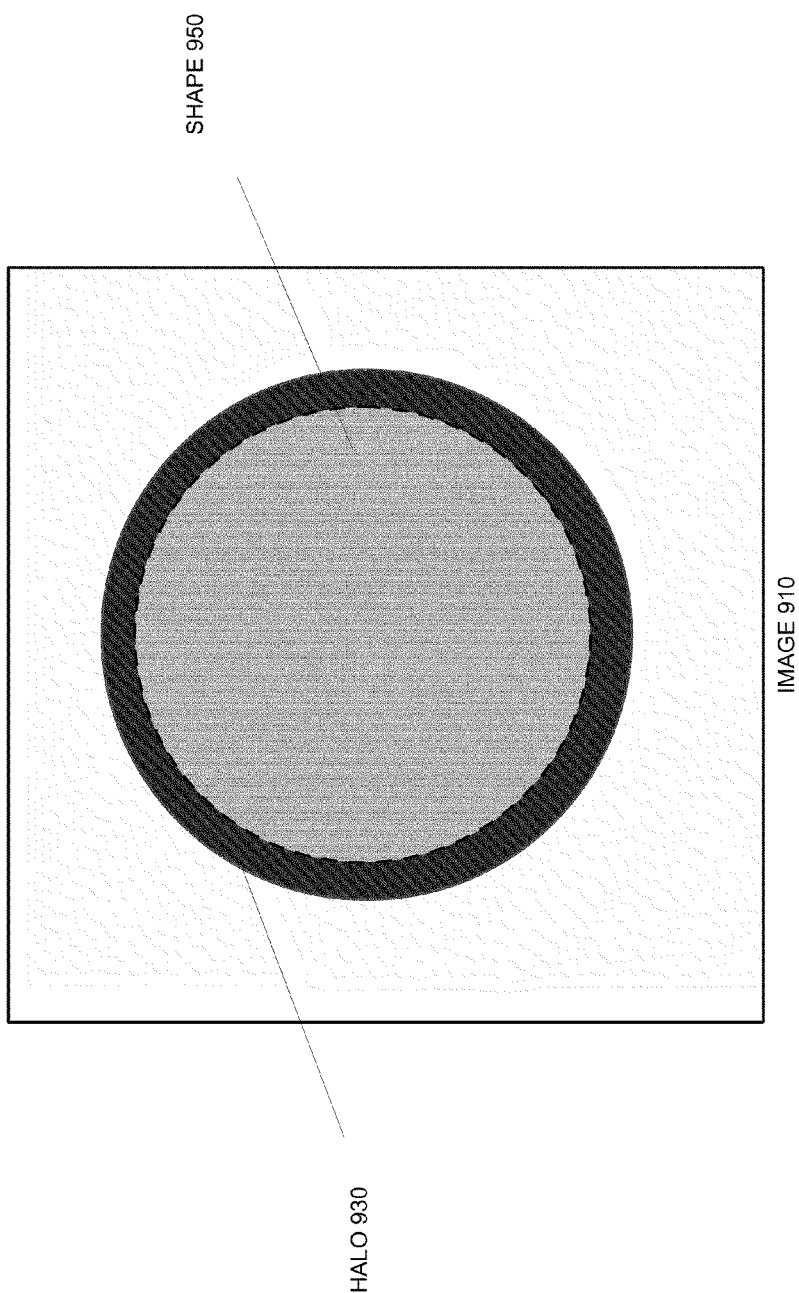
FIG. 9 illustrates a shape in an image plane where an object corresponding to the shape is covered with a material that limits the angle of view of the object corresponding to the shape according to one embodiment of the invention.

According to one embodiment of the invention, blooming may be effectively eliminated by covering the object with a material that limits the angle of view of the object. For example, FIG. 9 illustrates the shape 950 within the image 910. The object corresponding to the shape 950 is covered with a material that limits the angle of view of the object (e.g., a material similar to that used in a laptop display screen privacy filter). For example, with reference to FIG. 11, the sphere 1110 may be covered with a material that limits the angle of view of the object.

When an image is taken of an object covered in a material that limits the angle of view of the object, the shape in the image will be surrounded by a black halo. For example, the shape 950 is surrounded by the halo 930. If the object is a sphere (e.g., the sphere 1110), the halo surrounding the corresponding shape in the image will be substantially uniform (i.e., the thickness of the halo will be substantially the same around the shape). Regardless of the brightness of the background, the halo will remain the same thickness at a given distance. Thus, the thickness of the halo will be a factor of the distance between the object and the camera taking the image. According to one embodiment of the invention, the size of the shape is increased based on the thickness of the halo.

In one embodiment of the invention, the width of the halo is a linear function based on the distance between the camera and the tracked object. Since the width of the halo will be a linear function and the width does not change because of brightness of objects or backgrounds surrounding the tracked object, blooming is effectively eliminated. For example, as long as the size of the tracked object changes in relation to distance from the camera, and not because of brightness of objects surrounding the tracked object, the size of the ball in the image due to the halo will not affect the tracking of the object.

For example, with reference to FIG. 11, by covering the tracking sphere 1110 with a material that limits the angle of view of the tracking sphere 1110 (which will cause a halo to surround the tracking sphere 1110 in images generated by the digital camera 1140), the computing device 1150 can calculate the distance of the tracking sphere 1110 in relation to the digital camera 1140 without calculating an amount of bloom affecting the image. The distance value, along with the horizontal and vertical value, are used to determine a location of the tracking sphere 1110 in relation to the digital camera 1140, which will control actions associated with the computing device 1150.

Figure 10:
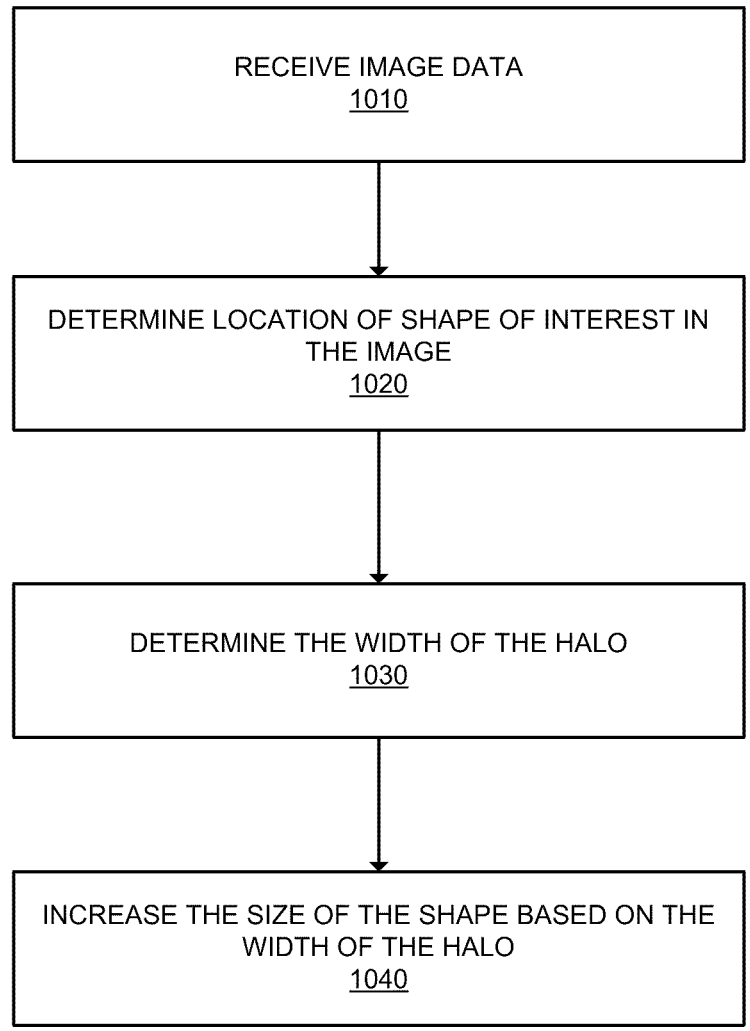
FIG. 10 is a flow diagram illustrating an exemplary blooming compensation mechanism in accordance with one embodiment of the invention.

According to another embodiment of the invention, the size of the shape corresponding to the tracked object is adjusted based on the width of the halo. FIG. 10 is a flow diagram illustrating an exemplary method for computing the size of a shape of interest in an image that corresponds to an object covered in a material that limits the angle of view of the object according to one embodiment of the invention. With reference to FIGS. 9 and 10, at block 1010, image data 910 is received. According to one embodiment of the invention, the image 1010 is generated by a digital camera similarly as described with reference to block 310. Flow moves from block 1010 to block 1020, where the shape of interest 950 in the image 910 is located. In one embodiment of the invention, the shape of interest is located using similar mechanisms as described in block 315. Flow moves from block 1020 to block 1030.

At block 1030, the width of the halo is determined. As previously described, typically the width of the halo is uniform. According to one embodiment of the invention, the pixels of the image are analyzed to determine the width of the halo. Flow moves from block 1030 to block 1040 where the size of the shape is increased based on the width of the halo.

Figure 14:
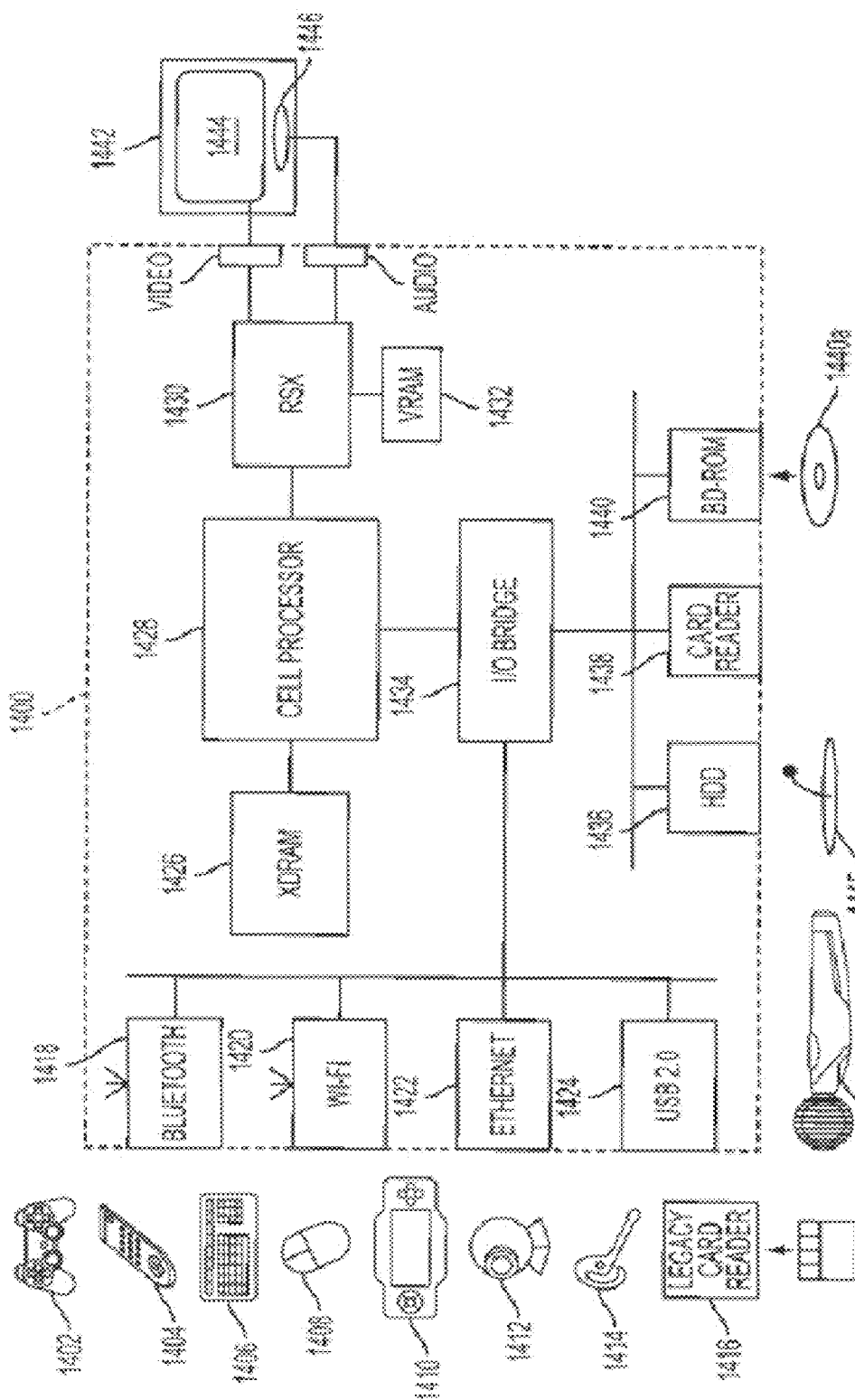
FIG. 14 illustrates hardware and user interfaces that may be used in accordance with one embodiment of the invention.

FIG. 14 illustrates hardware and user interfaces that may be used in accordance with one embodiment of the present invention. FIG. 14 schematically illustrates the overall system architecture of the Sony® PlayStation 3® entertainment device, a console that may be compatible for implementing a three-dimensional controller locating system and compensating for blooming in accordance with one embodiment of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to multiple Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony PlayStation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the PlayStation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the PlayStation® or PlayStation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the PlayStation™ Portable device may be used as a controller. In the case of the PlayStation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the PlayStation and PlayStation 2 devices, in addition to conventional pre-recorded and recordable CDs, and so-called Super Audio CDs. The reader 1440 is also operable to read DVD-ROMs compatible with the PlayStation 2 and PlayStation 3 devices, in addition to conventional pre-recorded and recordable DVDs. The reader 1440 is further operable to read BD-ROMs compatible with the PlayStation 3 device, as well as conventional pre-recorded and recordable Blu-Ray Disks.

The system unit 1400 is operable to supply audio and video, either generated or decoded by the PlayStation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The PlayStation 3 device's operating system supports Dolby® 5.1 surround sound, Dolby® Theatre Surround (DTS), and the decoding of 7.1 surround sound from Blu-Ray® disks.

In one embodiment of the invention, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 15:
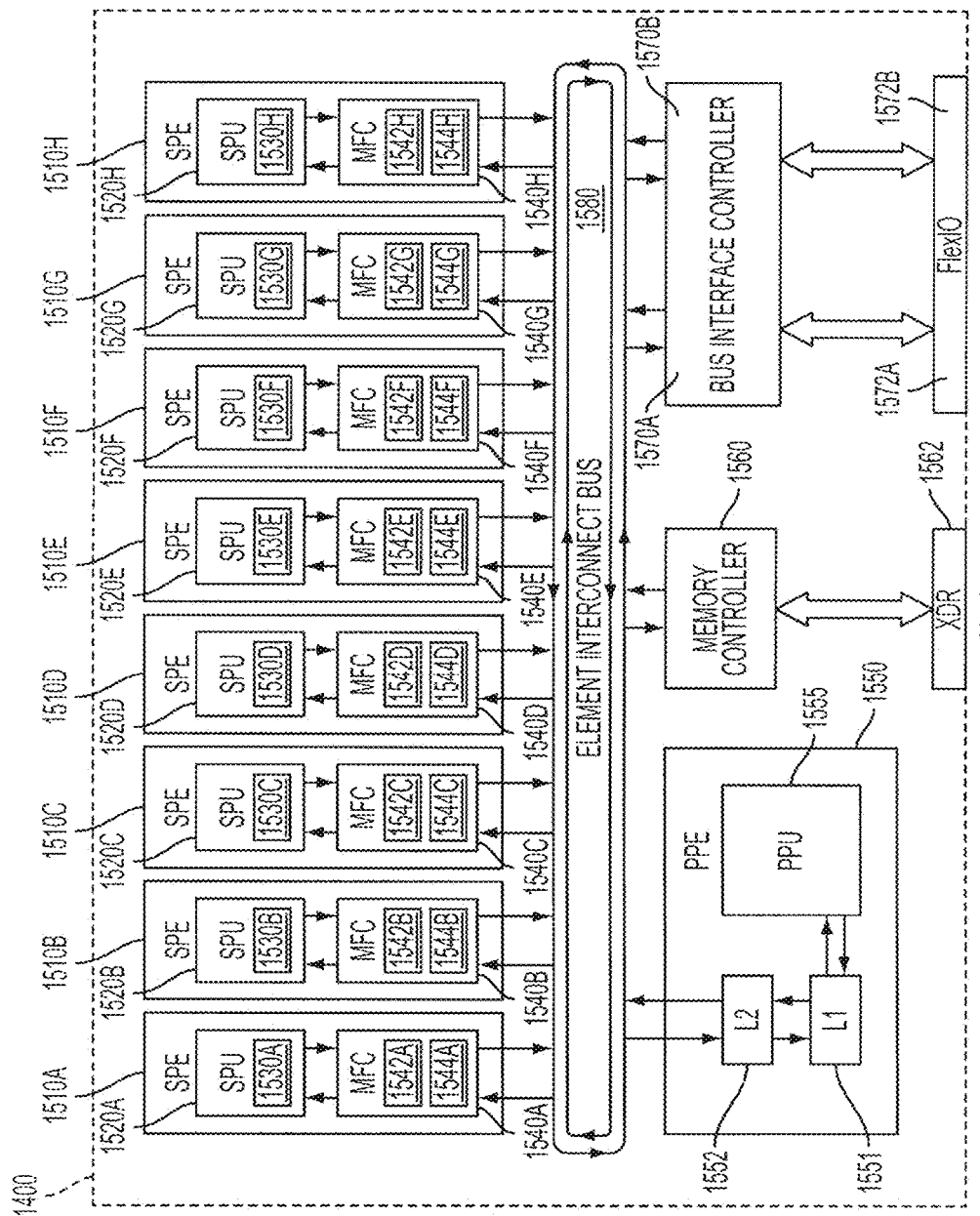
FIG. 15 illustrates additional hardware that may be used to process instructions according to one embodiment of the invention.

FIG. 15 illustrates additional hardware that may be used to process instructions, in accordance with one embodiment of the present invention. According to one embodiment of the invention, FIG. 15 illustrates the system unit 1400. Cell processor 1428 of FIG. 14 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the PlayStation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to compensate for blooming of a shape of an ellipse in an image that has been generated by a digital video camera, comprising:
    sampling a plurality of pixels outside of the shape of the ellipse;
    determining a brightness of each of the sampled pixels;
    averaging the brightness of those sampled pixels;
    determining a semi-major axis of the ellipse; and
    compensating for blooming of the shape based on the difference between a brightness of the shape and the average brightness of the sampled pixels, wherein the compensating for blooming includes applying an empirical data mapping to adjust the semi-major axis based on the difference between the brightness of the shape and the average brightness of the sampled pixels.

2. The method of claim 1, wherein the brightness of the shape is determined by:
    sampling one or more pixels within the shape in the image;
    determining a brightness of each of the sampled one or more pixels within the shape; and
    averaging those sampled pixels to determine the brightness of the shape.

3. The method of claim 1, wherein the brightness of the shape is known.

4. A method to compensate for blooming of a shape of an ellipse in an image generated by a digital camera, comprising:
    determining an edge of the shape of the ellipse;
    sampling a plurality of pixels outside of the edge of the shape along a corresponding plurality of radii for the shape, each beginning at a centroid of the shape and ending at an edge of the shape;
    determining a brightness of each of the sampled pixels; and
    for each sampled pixel, adjusting the corresponding radius for the shape based on a difference between a brightness inside the edge of the shape and the brightness of the sampled pixel.

5. The method of claim 4, wherein the adjustment of the corresponding radius is based on empirical mapping data.

6. The method of claim 4, wherein the determining the edge of the shape includes determining the location and dimensions of the shape in the image.

7. The method of claim 4, wherein the brightness inside the edge of the shape is determined by:
    sampling one or more pixels inside the edge of the shape in the image;
    determining a brightness of each of the sampled one or more pixels; and
    averaging those sampled pixels to determine the brightness of the shape.

8. The method of claim 4, wherein the brightness inside the edge of the shape is known.

9. A non-transitory machine-readable storage medium that provides instructions that, if executed by a processor, will cause said processor to perform operations to compensate for blooming of a shape of an ellipse in an image that has been generated by a digital camera, the operations comprising:
    sampling a plurality of pixels outside of the shape;
    determining a brightness of each of the sampled pixels;
    averaging the brightness of those sampled pixels;
    determining a semi-major axis of the ellipse; and
    compensating for blooming of the shape based on the difference between a brightness of the shape and the average brightness of the sampled pixels, wherein the compensating for blooming includes applying an empirical data mapping to adjust the semi-major axis based on the difference between the brightness of the shape and the average brightness of the sampled pixels.

10. The non-transitory machine-readable storage medium claim 9, wherein the brightness of the shape is determined by:
sampling one or more pixels within the shape in the image;
determining a brightness of each of the sampled one or more pixels within the shape; and
averaging those sampled pixels to determine the brightness of the shape.

11. The non-transitory machine-readable storage medium claim 9, wherein the brightness of the shape is known.

12. A computing device to compensate for blooming of an object projected as an ellipse shape on an image that has been generated by a digital camera, the computing device comprising:
a processor to execute instructions; and
a memory coupled with the processor, the memory having instructions that, when executed, cause the processor to perform operations including,
sampling a plurality of pixels outside of the ellipse shape,
determining a brightness of each of the sampled pixels, averaging the brightness of those sampled pixels,
determining a semi-major axis of the ellipse shape, and
compensating for blooming of the ellipse shape based on the difference between a brightness of the ellipse shape and the average brightness of the sampled pixels, wherein the compensating for blooming includes applying an empirical data mapping to adjust the semi-major axis based on the difference between the brightness of the ellipse shape and the average brightness of the sampled pixels.

13. The computing device of claim 12, wherein the brightness of the shape is determined by:
sampling one or more pixels within the shape in the image;
determining a brightness of each of the sampled one or more pixels within the shape; and
averaging those sampled pixels to determine the brightness of the shape.

14. The computing device of claim 12, wherein the brightness of the shape is known.

15. A computing device to compensate for blooming of an object projected as a shape of an ellipse on an image, the computing device, comprising:
a processor to execute instructions; and
a memory coupled with the processor, the memory having instructions that, when executed, cause the processor to perform operations including:
determining an edge of the shape of the ellipse,
sampling a plurality of pixels outside of the edge of the shape along a corresponding plurality of radii for the shape, each beginning at a centroid of the shape and ending at an edge of the shape,
determining a brightness of each of the sampled pixels, and
for each sampled pixel, adjusting the corresponding radius for the shape based on a difference between a brightness inside the edge of the shape and the brightness of the sampled pixel.

16. The computing device of claim 15, wherein the adjustment of the corresponding radius is based on empirical mapping data.

17. The computing device of claim 15, wherein the determining the edge of the shape includes determining the location and dimensions of the shape in the image, wherein the edge of the shape includes pixels immediately surrounding the shape.

18. The computing device of claim 15, wherein the brightness inside the edge of the shape is determined by:
sampling one or more pixels inside the edge of the shape in the image;
determining a brightness of each of the sampled one or more pixels; and
averaging those sampled pixels to determine the brightness of the shape.

19. The computing device of claim 15, wherein the brightness inside the edge of the shape is known.

20. A non-transitory machine-readable storage medium that provides instructions that, if executed by a processor, will cause said processor to perform operations to compensate for blooming of a shape of an ellipse in an image generated by a digital camera, the operations comprising:
determining an edge of the shape of the ellipse;
sampling a plurality of pixels outside of the edge of the shape along a corresponding plurality of radii for the shape, each beginning at a centroid of the shape and ending at an edge of the shape;
determining a brightness of each of the sampled pixels; and
for each sampled pixel, adjusting the corresponding radius for the shape based on a difference between a brightness inside the edge of the shape and the brightness of the sampled pixel.

21. The non-transitory machine-readable storage medium of claim 20, wherein the brightness of the shape is determined by:
sampling one or more pixels inside the edge of the shape in the image;
determining a brightness of each of the sampled one or more pixels; and
averaging those sampled pixels to determine the shape's brightness.

22. The non-transitory machine-readable storage medium of claim 20, wherein the brightness inside the edge of the shape is known.

23. The non-transitory machine-readable storage medium of claim 20, wherein the adjustment of the corresponding radius is based on empirical mapping data.

24. The non-transitory machine-readable storage medium of claim 20, wherein determining the edge of the shape includes determining the location and dimension of the shape in the image.

25. A method to compensate for blooming of a shape of an ellipse in an image that has been generated by a digital video camera, comprising:
sampling a plurality of pixels outside of the shape of the ellipse;
determining a brightness of each of the sampled pixels;
averaging the brightness of those sampled pixels;
determining a semi-major axis of the ellipse; and
compensating for blooming of the shape based on the difference between a brightness of the shape and the average brightness of the sampled pixels, wherein the compensating for blooming includes adjusting the semi-major axis based on the difference between the brightness of the shape and the average brightness of the sampled pixels.

* * * * *